United States Patent
Marchioro

(10) Patent No.: US 6,606,964 B2
(45) Date of Patent: Aug. 19, 2003

(54) MODULAR CAGE

(75) Inventor: Domenico Marchioro, Castelnovo di Isola Vicentina (IT)

(73) Assignee: Marchioro S.p.A. Stampaggio Materie Plastiche, Castelnovo di Isola Vicentina (IT)

( * ) Notice: Subject to any disclaimer, the term of this patent is extended or adjusted under 35 U.S.C. 154(b) by 0 days.

(21) Appl. No.: 10/081,855

(22) Filed: Feb. 25, 2002

(65) Prior Publication Data
US 2002/0117118 A1 Aug. 29, 2002

(30) Foreign Application Priority Data
Feb. 27, 2001 (IT) .................................. PD2001015 U

(51) Int. Cl.[7] .............................................. A01K 1/02
(52) U.S. Cl. ...................................... 119/452; 119/474
(58) Field of Search ........................ 119/452–461, 474, 119/491, 498, 499, 427, 431, 453, 459, 472, 482, 489, 496; 446/108, 109, 111–116; 403/326, 327, 329, 382, 402, 403

(56) References Cited

U.S. PATENT DOCUMENTS

| | | | | |
|---|---|---|---|---|
| 1,915,215 A | * | 6/1933 | Carpenter | 217/69 |
| 3,381,664 A | * | 5/1968 | Barlocci | 119/474 |
| 4,072,433 A | * | 2/1978 | Veyhl | 403/172 |
| 4,702,638 A | * | 10/1987 | Zalesak | 312/140 |
| 5,452,681 A | * | 9/1995 | Ho | 119/461 |
| 5,497,728 A | * | 3/1996 | Watanabe | 119/452 |
| 5,544,619 A | * | 8/1996 | Braun | 119/461 |
| 5,626,098 A | * | 5/1997 | Askins et al. | 119/461 |
| 6,460,486 B1 | * | 10/2002 | Powers et al. | 119/452 |

FOREIGN PATENT DOCUMENTS

CH          646594 A5  * 12/1984  ............. A47F/3/12

\* cited by examiner

Primary Examiner—Charles T. Jordan
Assistant Examiner—Kimberly S. Smith
(74) Attorney, Agent, or Firm—Guido Modiano; Albert Josif; Daniel O'Byrne

(57) ABSTRACT

A modular cage comprising a bottom surmounted by, and associated with, grille-like walls which are mutually connected by connecting means; the connecting means comprise a first corner joint constituted by a first component that has a hollow corner body in which there are first seats for positioning three convergent grille-like walls, the first component being associated, by way of reversible interlocking anchoring means, with a complementary substantially plate-like second component.

16 Claims, 6 Drawing Sheets

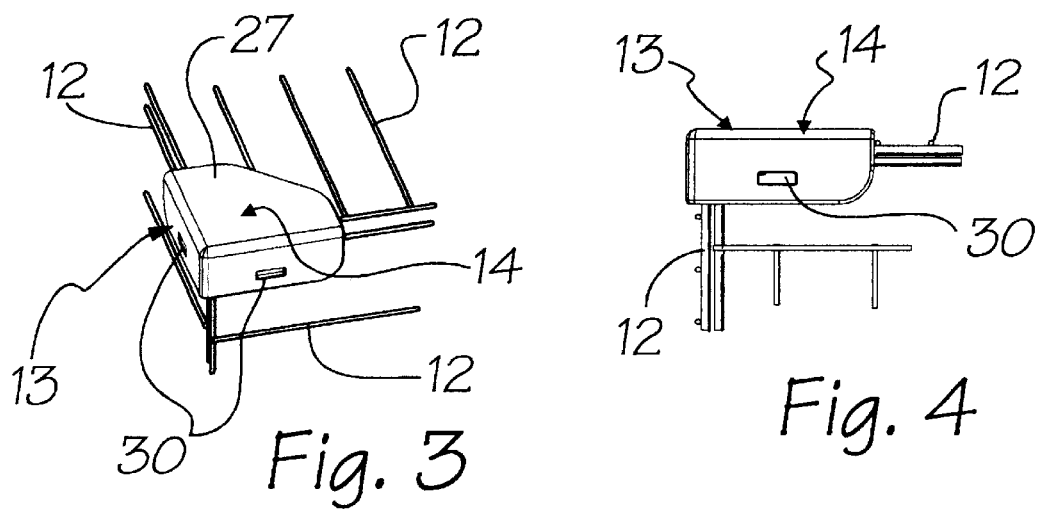
Fig. 3
Fig. 4
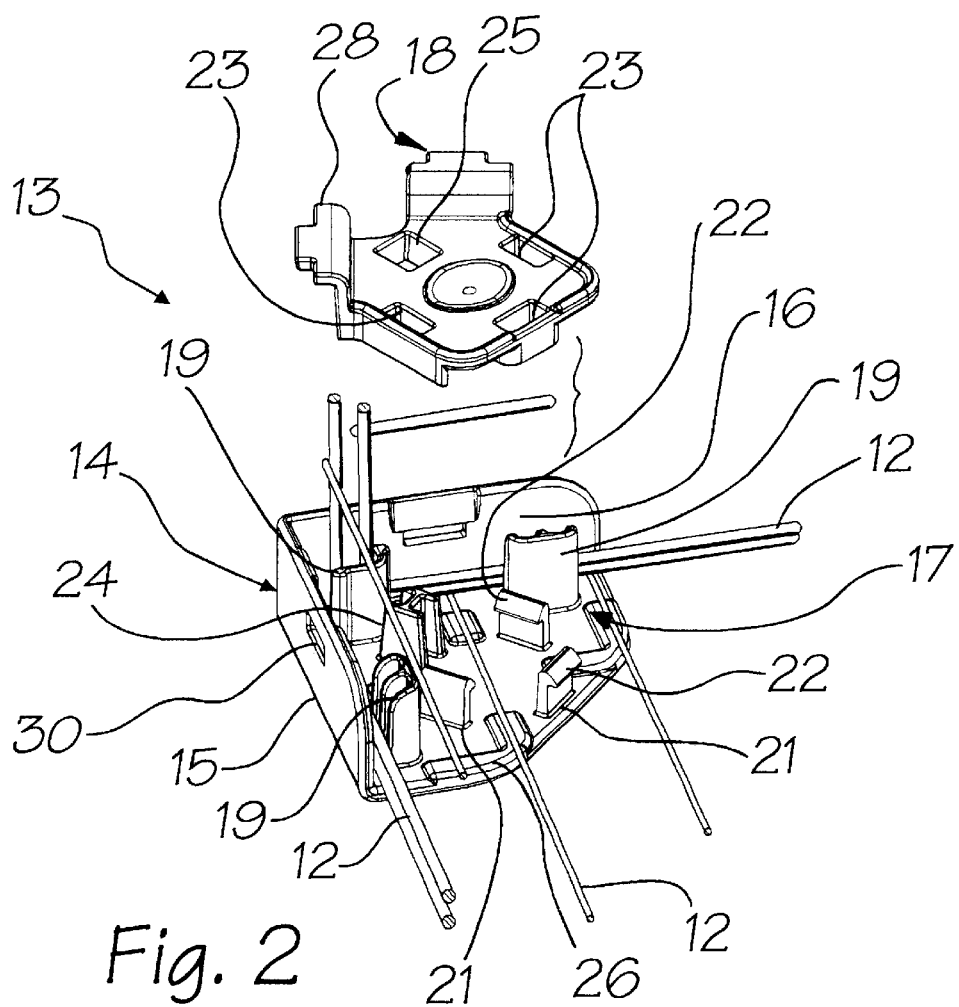
Fig. 2

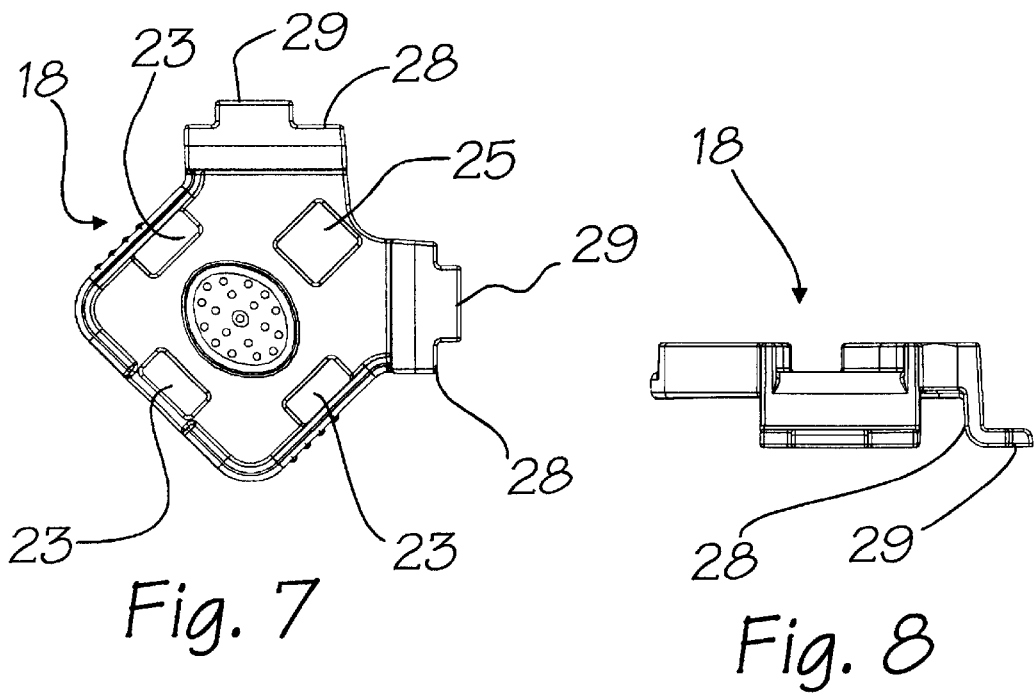
Fig. 7
Fig. 8
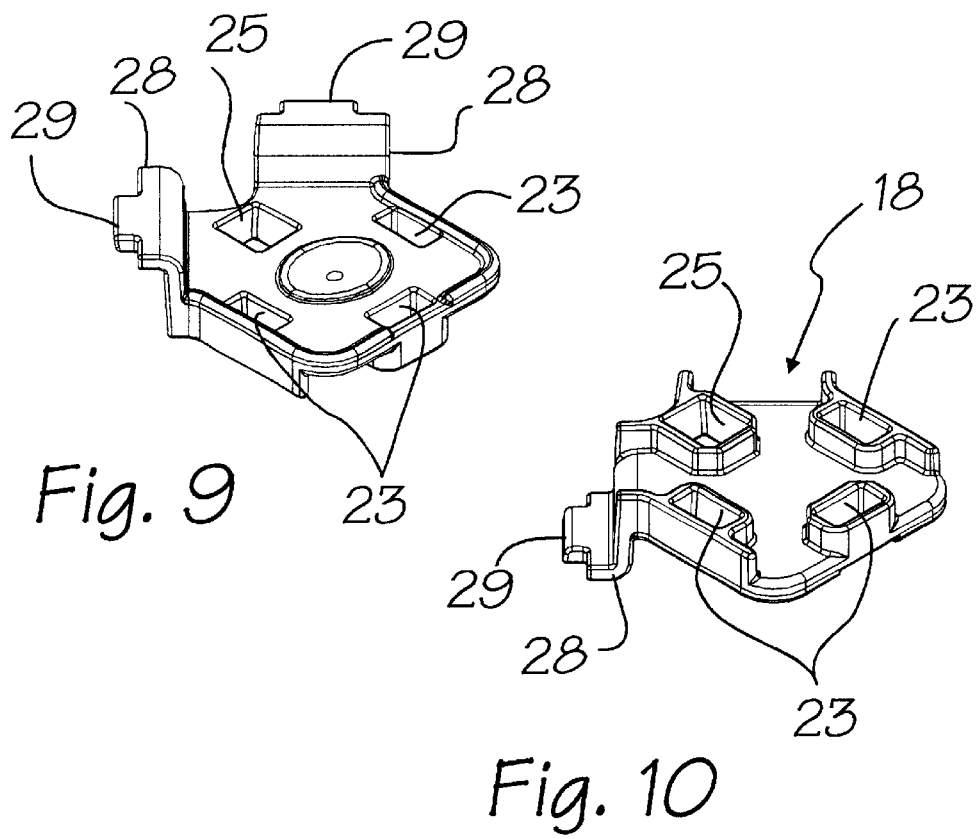
Fig. 9
Fig. 10

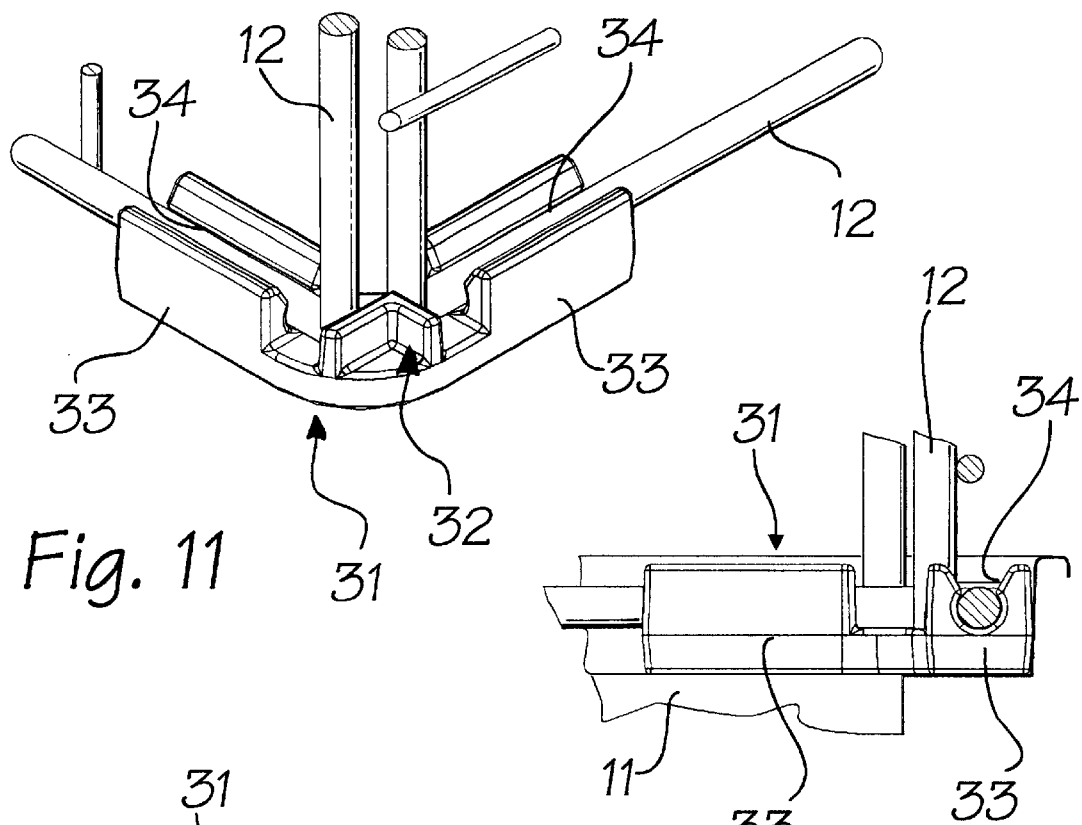
Fig. 11
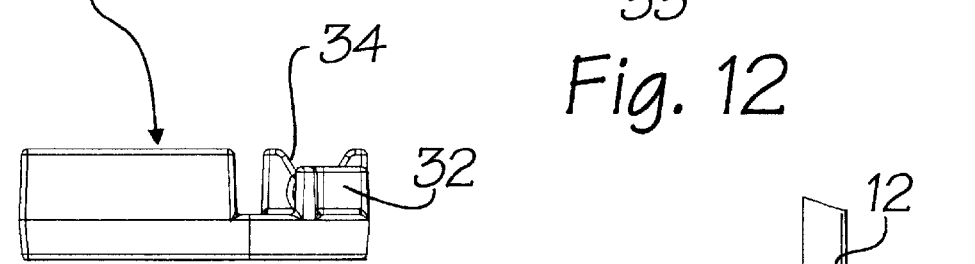
Fig. 12
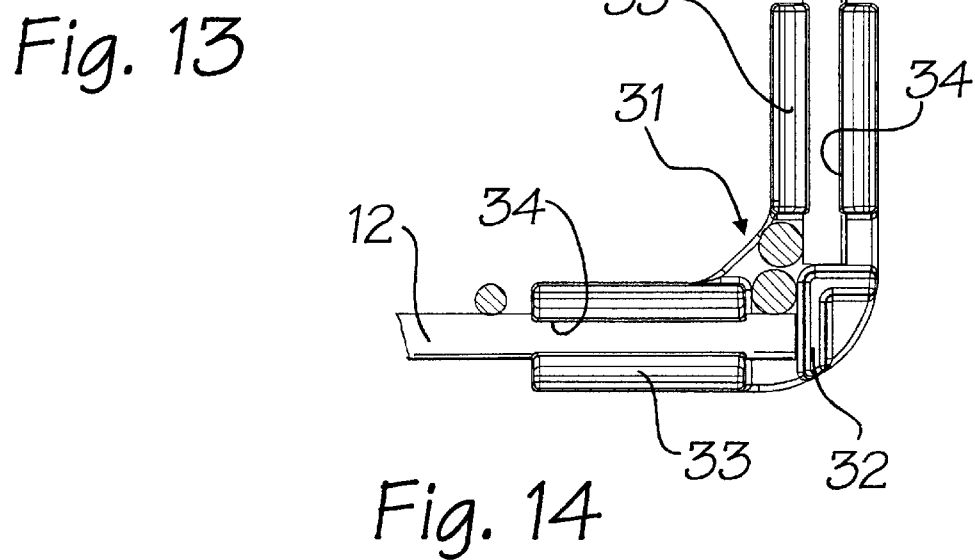
Fig. 13
Fig. 14

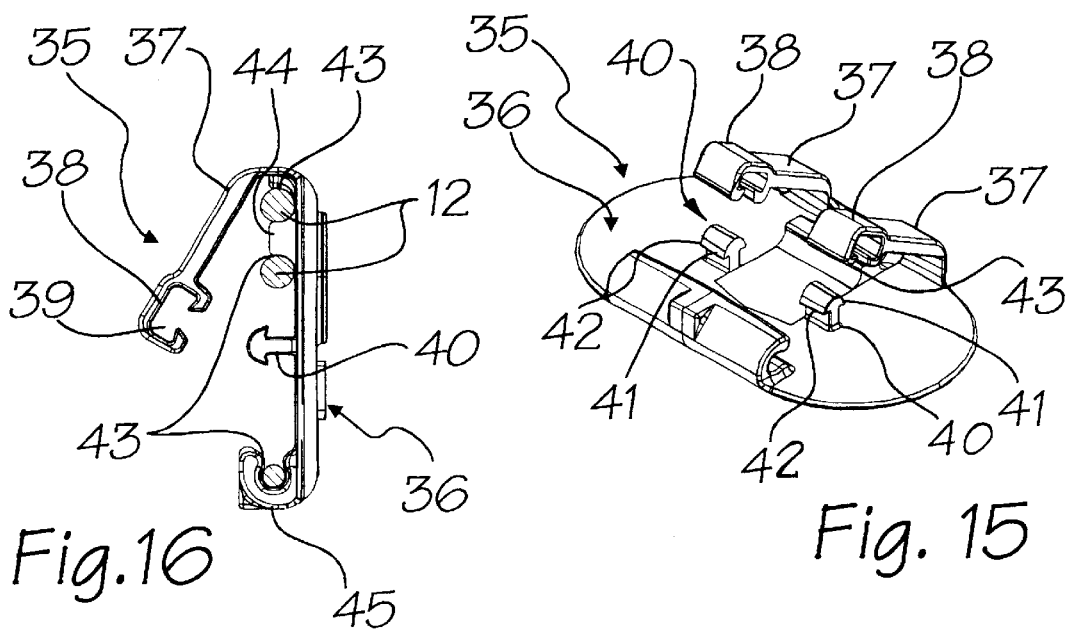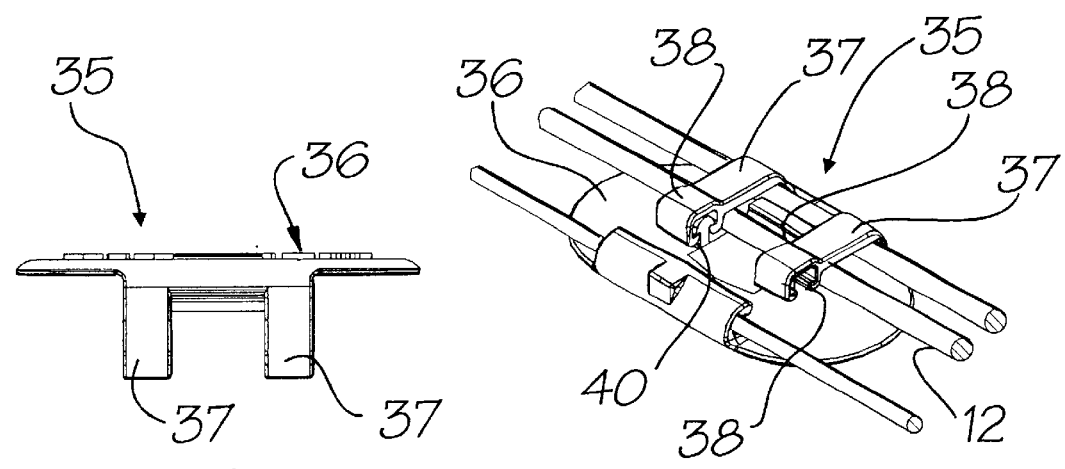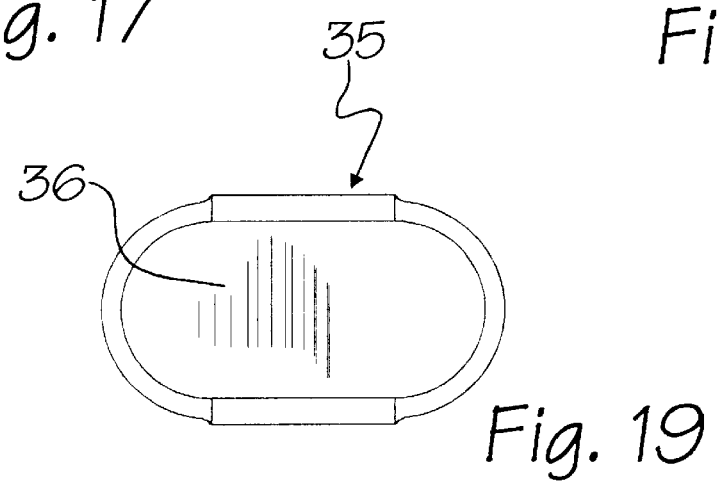

MODULAR CAGE

BACKGROUND OF THE INVENTION

The present invention relates to a modular cage.

Modular cages comprising a bottom that is surmounted by, and associated with, grille-like walls mutually joined by connecting means have long been used successfully in various fields of application, such as the containment of animals, plants, or the like.

These cages, though the variety of their embodiments, have reversible connecting means constituted by engagement devices that have various shapes and configurations but ensure the connection of no more than two convergent walls.

As an alternative, there are couplings provided by way of axial insertion of elements of the grilles in tubular connecting elements to be arranged in the corners.

The connecting systems that are normally used, however, do not provide characteristics of flexibility in application that are particularly satisfactory also in relation to the solidity and the safety of the connection.

SUMMARY OF THE INVENTION

The aim of the present invention is to provide a modular cage that solves the above noted drawbacks of known cage models, particularly allowing the simultaneous association of three grille-like walls without however reducing structural solidity and flexibility of application.

Within this aim, an important object of the present invention is to provide a cage whose structure can be composed according to various configurations simply and rapidly even by personnel and/or users having no particular technical skills.

Another object of the present invention is to provide a cage whose structure has production and assembly costs that are competitive with respect to known cages.

Another object of the present invention is to provide a cage whose structure allows an optimum level of packing during storage.

Another object of the present invention is to provide a cage whose structure can be manufactured with known technologies and equipment.

This aim and these and other objects that will become better apparent hereinafter are achieved by a modular cage which comprises a bottom surmounted by, and associated with, grille-like walls which are mutually connected by applied connecting means, characterized in that said connecting means comprise a first corner joint constituted by a first component that has a hollow corner body in which there are first seats for positioning three convergent grille-like walls, said first component being associated, by way of reversible interlocking anchoring means, with a complementary substantially plate-like second component.

BRIEF DESCRIPTION OF THE DRAWINGS

Further characteristics and advantages of the present invention will become better apparent from the description of an embodiment thereof, illustrated only by way of non-limitative example in the accompanying drawings, wherein:

FIG. 2 is a perspective view of a detail of the cage of FIG. 1 during application;

FIGS. 3 and 4 are respectively a perspective view and a side view of the detail of FIG. 2;

FIGS. 7 and 8 are partially sectional views of a component of the detail of FIG. 2;

FIGS. 9 and 10 are perspective views of the component of FIG. 7;

FIG. 11 is a perspective view of another detail of the cage of FIG. 1;

FIGS. 12 to 14 are partially sectional views of the detail of FIG. 11;

FIG. 15 is a perspective view of another detail of the cage of FIG. 1;

FIGS. 16 and 17 are views of the detail of FIG. 15;

FIG. 18 is a perspective view of the detail of FIG. 15;

FIG. 19 is a view of the detail of FIG. 15.

DESCRIPTION OF THE PREFERRED EMBODIMENTS

Figure 1:
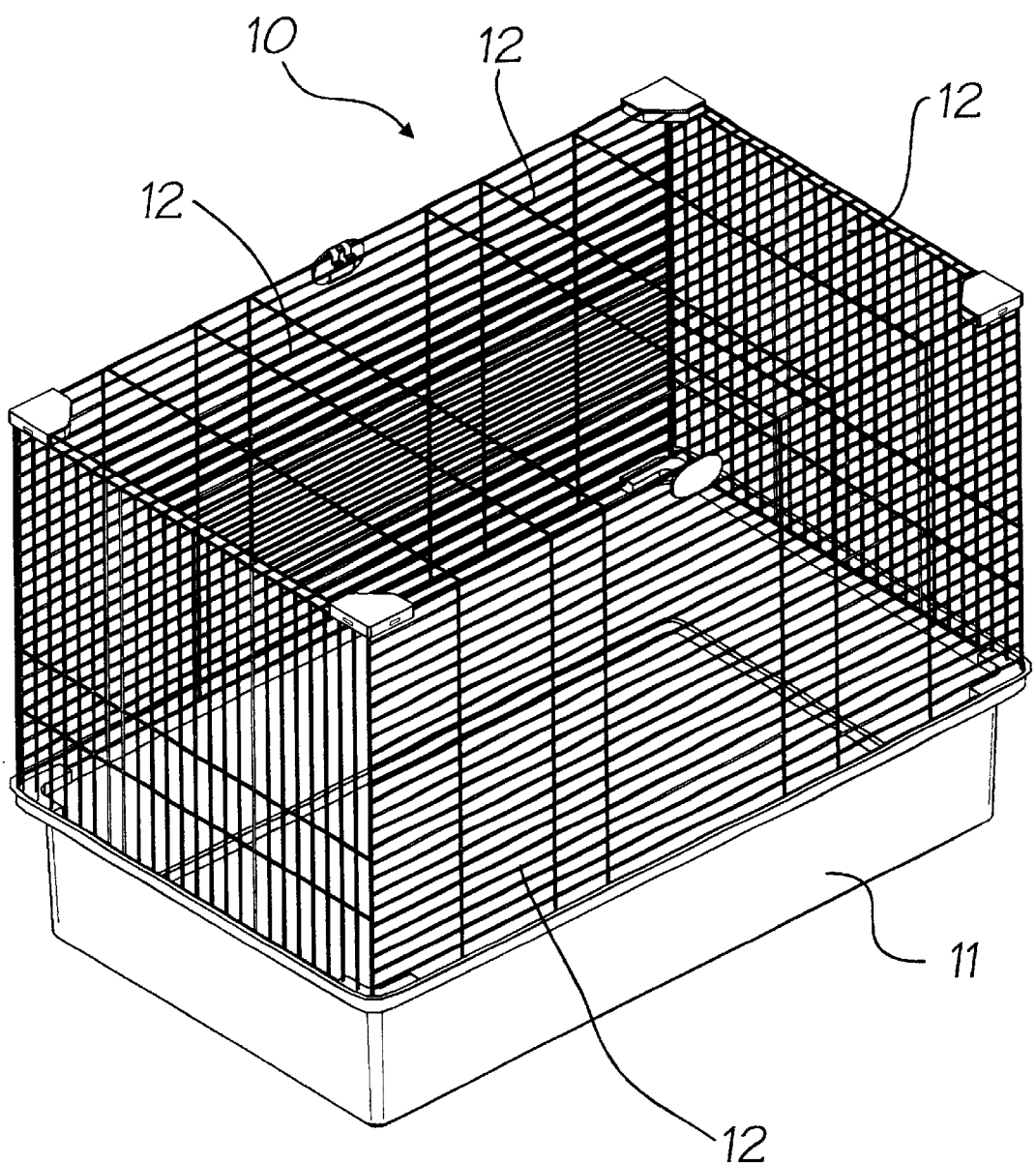
FIG. 1 is a perspective view of a cage according to the invention.
Figure 5:
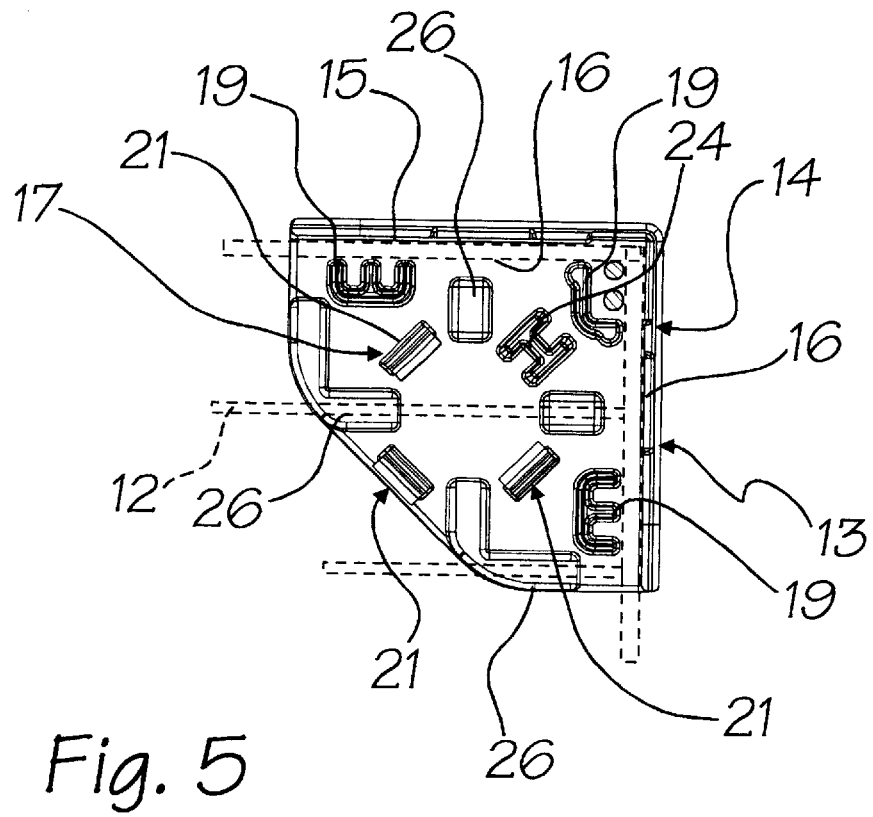
FIGS. 5 and 6 are partially sectional views of the detail of FIG. 2.
Figure 6:
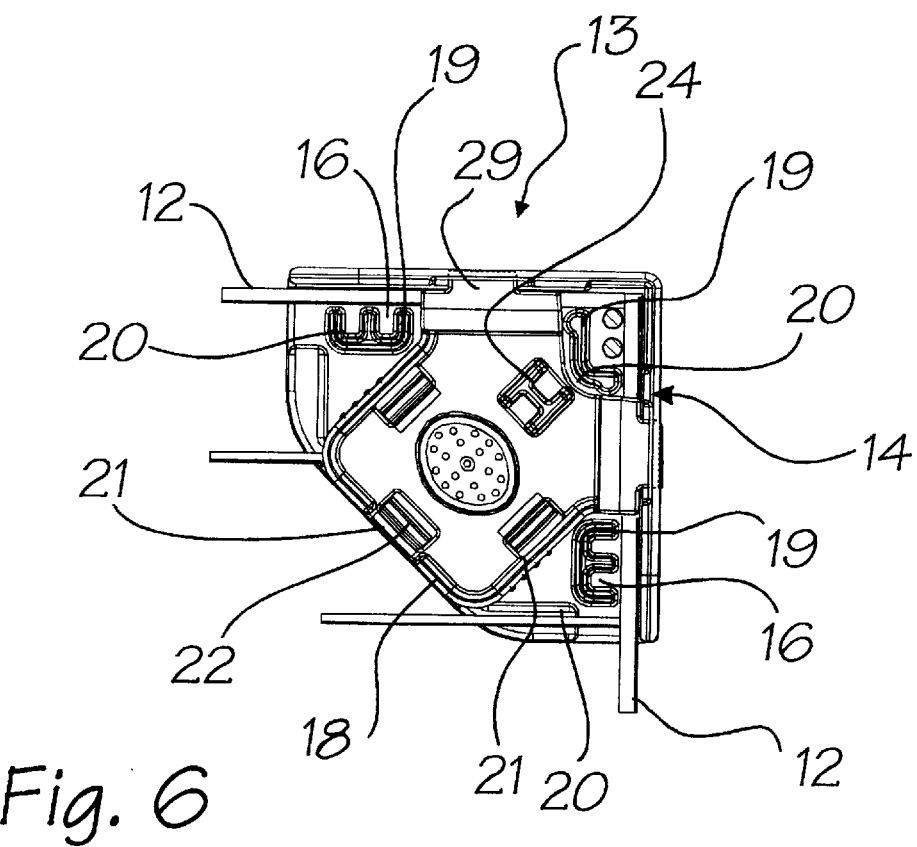

With particular reference to FIGS. 1 to 15, a modular cage having the structure according to the invention is generally designated by the reference numeral 10.

The cage 10 comprises a bottom 11, which in this case is tray-like and is surmounted by, and associated with, grille-like walls 12 which are mutually connected by connecting means which are described in greater detail hereinafter.

The connecting means comprise a first corner joint, generally designated by the reference numeral 13, which is constituted by a first component 14, with a concave corner body 15 in which there are first seats 16 for positioning three convergent grille-like walls 12; the body 15 is associated, by way of reversible interlocking anchoring means generally designated by the reference numeral 17, with a complementary second component 18 for locking the assembly.

The anchoring means 17 comprise three first guiding and centering protrusions 19 which protrude from the first component 14 and are suitable to enter corresponding preset centering profiles 20 formed in the second opposite component 18, the first protrusions 19 being suitable to cooperate with the body 15 of the first component 14 in forming the first positioning seats 16.

The first protrusions 19 are substantially perpendicular to the plane of contact between said first component 14 and said second component 18.

The anchoring means also comprise three tabs 21 which protrude from the first component 14 and have, at their free end, a corresponding first anchoring tooth 22 which is suitable to enter, with an interlocking action, a corresponding and complementarily shaped second seat 23 formed in the facing second component 18.

Each one of the tabs 21 is substantially perpendicular to the plane of contact between the first component 14 and the second component 18.

A guiding and centering element 24 also protrudes at right angles from the first component 14 and is suitable to enter a preset and corresponding third seat 25 formed in the opposite second component 18; studs 26 for supporting the walls 12 also protrude from the component 14.

The first protrusions 19, the tab 21 and the element 24 protrude monolithically from a surface 27 of the first component 14 that faces upon assembly the second component 18.

Two second contoured plate-like protrusions 28 protrude from edge portions of the second component 18 and are suitable to cooperate, as an upward closure, in forming the first positioning seats 16.

Each one of the second protrusions 28 has, at its free end, a second centering tooth 29 which is suitable to enter a corresponding hole 30 formed in the body 15 of said first component 14.

The connecting means also comprise second corner joints 31, each of which has a substantially L-shaped body with an abutment 32 and with end sections 33 shaped so as to form channels 34 with rims for the interlocking insertion of two convergent walls 12.

The connecting means further comprise a support 35, which is constituted by a plate-like body 36 with arms 37 that are articulated thereto along one edge, each arm having an end 38 which is shaped so as to form a fourth seat 39 for locking on a corresponding and complementarily shaped third protrusion 40 which protrudes at right angles from said body 36 of the support.

Each one of the third protrusions 40 has a mushroom-shaped head 41 with edges 42 for engaging the end 38 of the corresponding arm 37.

The body 36 of the support 35 has portions suitable to form channels 43 with rims suitable for the interlocking insertion of portions of grille-like wall 12.

Two of the portions 44 are arranged at the articulation of the arms 37, by which they are closed, while another opposite portion 45 that lies beyond the interference of the arms 37 is suitable to form an abutment for the support 35.

In practice it has been found that the present invention has achieved the intended aim and objects.

In particular, it should be noted that the cage having the structure according to the invention allows the simultaneous association of three grille-like walls without however reducing structural solidity and flexibility of application.

The mutual interlocking fixing of the first and second components of the first joint in fact ensure considerable structural locking of three convergent grille-like walls.

It should also be noted that the cage having the structure according to the invention can be composed according to various configurations simply and rapidly even by personnel and/or users having no particular technical skills.

It should also be noted that the cage having the structure according to the invention can be provided with production and assembly costs that are fully competitive with respect to those of known cages.

It should also be noted that the cage having the structure according to the invention allows an optimum level of packing during storage.

The present invention is susceptible of numerous modifications and variations, all of which are within the scope of the inventive concept; moreover, the technical details can be replaced with other technically equivalent elements.

The materials and the dimensions may be any according to requirements.

The disclosures in Italian Utility Model Application No. PD2001U000015 from which this application claims priority are incorporated herein by reference.

What is claimed is:

1. A modular cage comprising a bottom surmounted by, and associated with, grille-like walls which are mutually connected by applied connecting means, characterized in that said connecting means comprise a first corner joint constituted by a first component that has a hollow corner body in which there are first seats for positioning three convergent grille-shaped walls, said first component being associated, by way of reversible interlocking anchoring means, with a complementary substantially plate-shaped second component.

2. The cage according to claim 1, wherein said anchoring means comprise one or more first centering protrusions which protrude from one of said first and second components and are suitable to enter corresponding preset centering profiles formed in another one of said first and second component, said first protrusions being suitable to cooperate with the body of said first component in forming said first positioning seats.

3. The cage according to claim 2, wherein each one of said one or more first centering protrusions is substantially perpendicular to the plane of contact between said first and second components.

4. The cage according to claim 1, wherein said anchoring means comprise one or more tabs which protrude from one of said first and second components and have, at a free end thereof, a corresponding first anchoring tooth which is suitable to enter, with an interlocking action, a corresponding and complementarily shaped second seat formed in another one of said first and second component.

5. The cage according to claim 4, wherein each one of said one or more tabs is substantially perpendicular to a plane of contact between said first and second components.

6. The cage according to claim 2, wherein each one of said one or more first centering protrusions protrudes monolithically from a surface of said first component that faces, upon assembly, said second component.

7. The cage according to claim 4, wherein each one of said one or more tabs protrudes monolithically from a surface of said first component that faces, upon assembly, said second component.

8. The cage according to claim 6, wherein at least one guiding and centering element protrudes substantially at right angles and monolithically from said first component at the surface that faces, upon assembly, said second component, said element being suitable to enter a preset and corresponding third seat formed in said second component.

9. The cage according to claim 1, characterized in that studs for supporting the grille-shaped walls protrude from said first component.

10. The cage according to claim 1, characterized in that second contoured plate-shaped protrusions protrude from edge portions of said second component and are suitable to cooperate, as an upward closure, to the formation of said first positioning seats.

11. The cage according to claim 10, wherein each one of said second protrusions has, at a free end thereof, a second centering tooth, which is suitable to enter a corresponding hole formed in the body of said first component.

12. The cage according to claim 1, further comprising one or more second corner assembly joints, each of which has a substantially L-shaped body with an abutment and end sections which are shaped so as to form channels with rims for interlocking insertion of two convergent walls.

13. The cage according to claim 10, characterized in that it comprises a support constituted by a plate-shaped body provided with arms which are articulated thereto along one edge, each of which has an end shaped so as to form a fourth seat for locking on a corresponding and complementarily shaped third protrusion that protrudes at right angles from said body of the support.

14. The cage according to claim 13, characterized in that each one of said third protrusions has a mushroom-shaped head with edges for engaging an end of the corresponding arm.

15. The cage according to claim 13, characterized in that the body of said support has portions suitable to form channels with rims suitable for interlocking insertion of portions of said grille-shaped wall.

16. The cage according to claim 15, characterized in that at least one of said portions of grille-shaped wall is arranged at an articulation of said arms, by which it is closed, while another opposite portion, which lies beyond the interference of said arms, is suitable to form an abutment in application for said support.

\* \* \* \* \*